July 19, 1966  H. G. TALMADGE, JR  3,261,966
ORBIT COMPUTER FOR A SATELLITE POSITION DISPLAY
Filed July 30, 1962  4 Sheets-Sheet 1
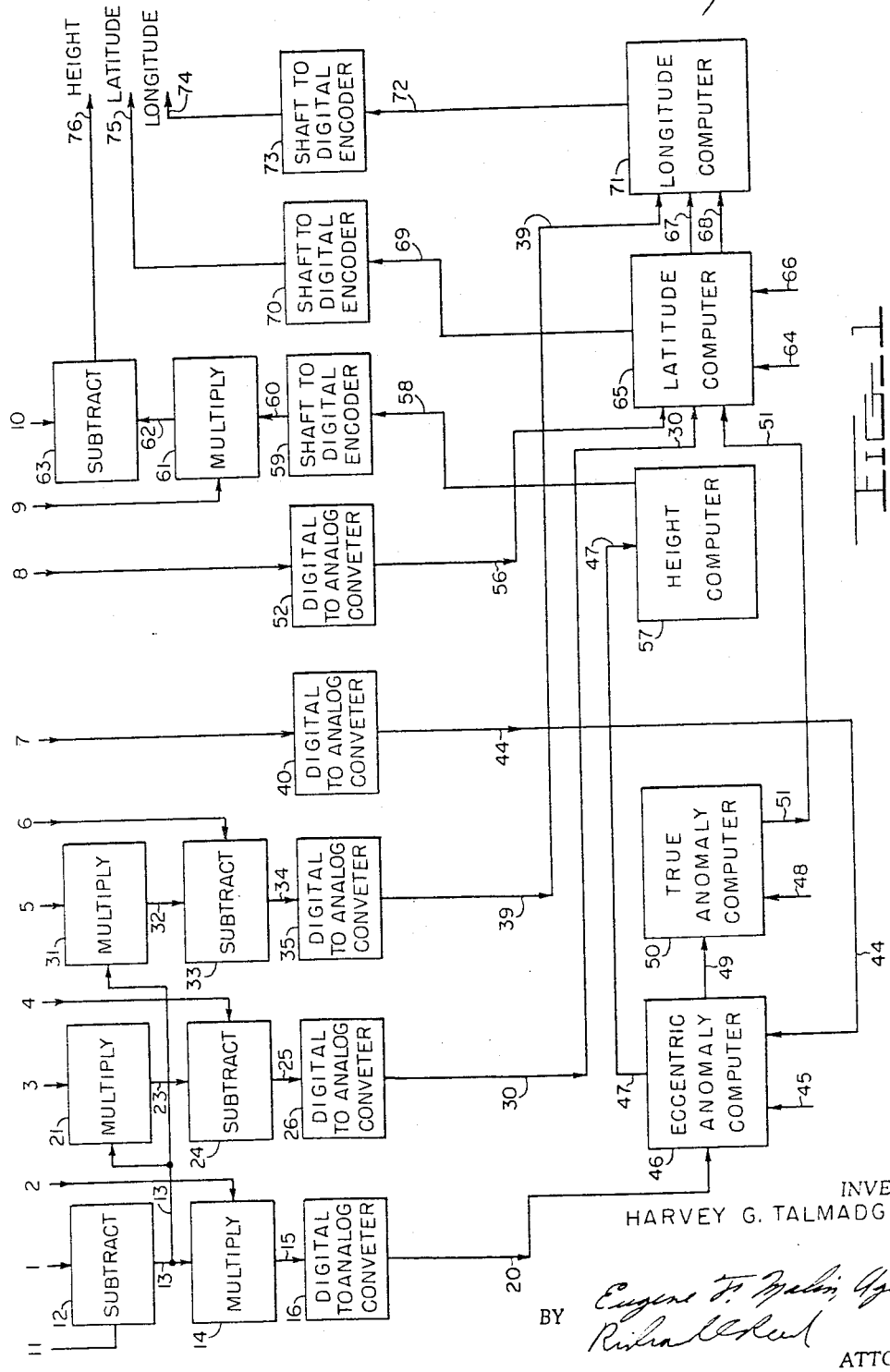
INVENTOR
HARVEY G. TALMADGE, JR.
BY
ATTORNEY

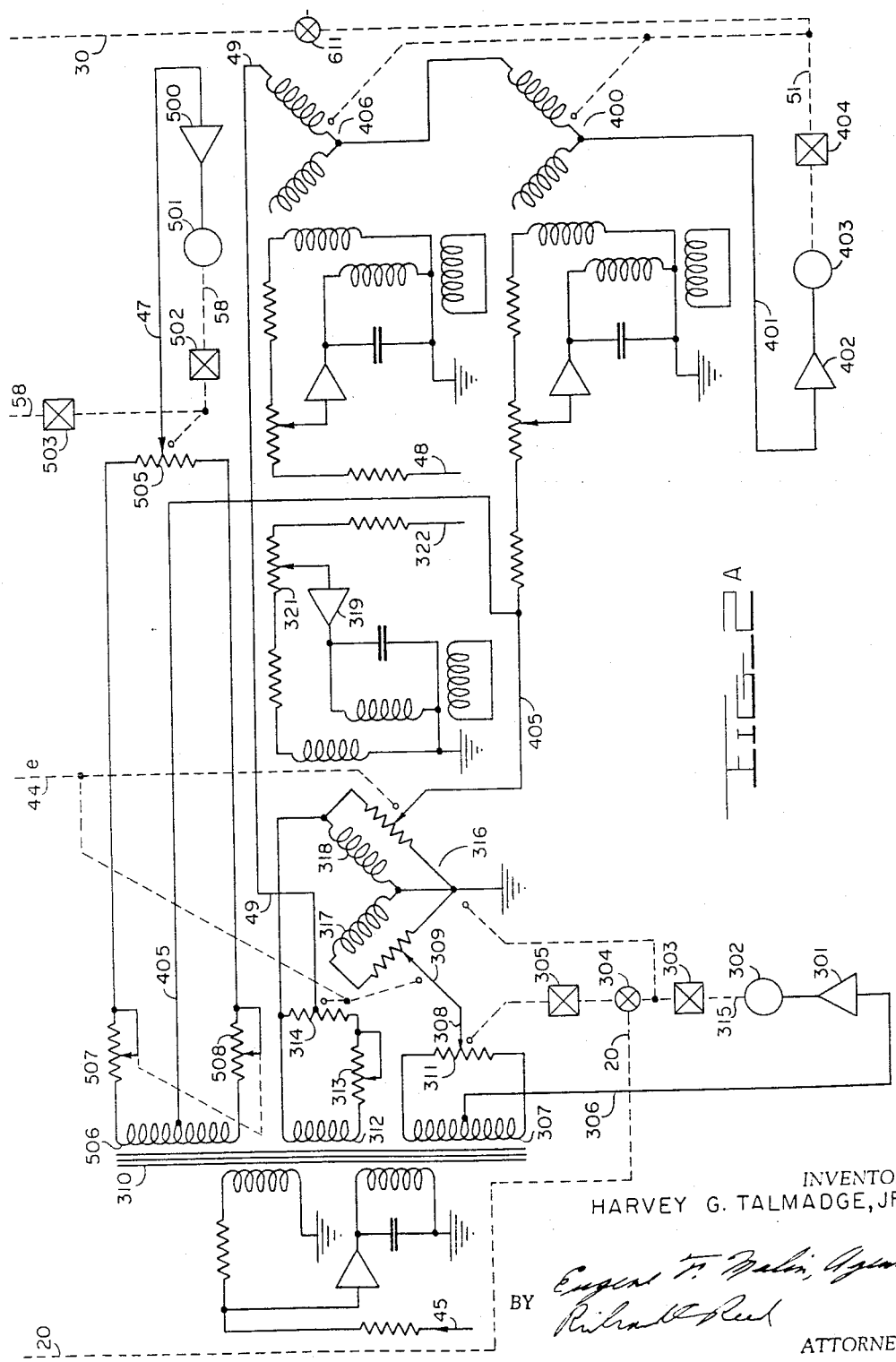

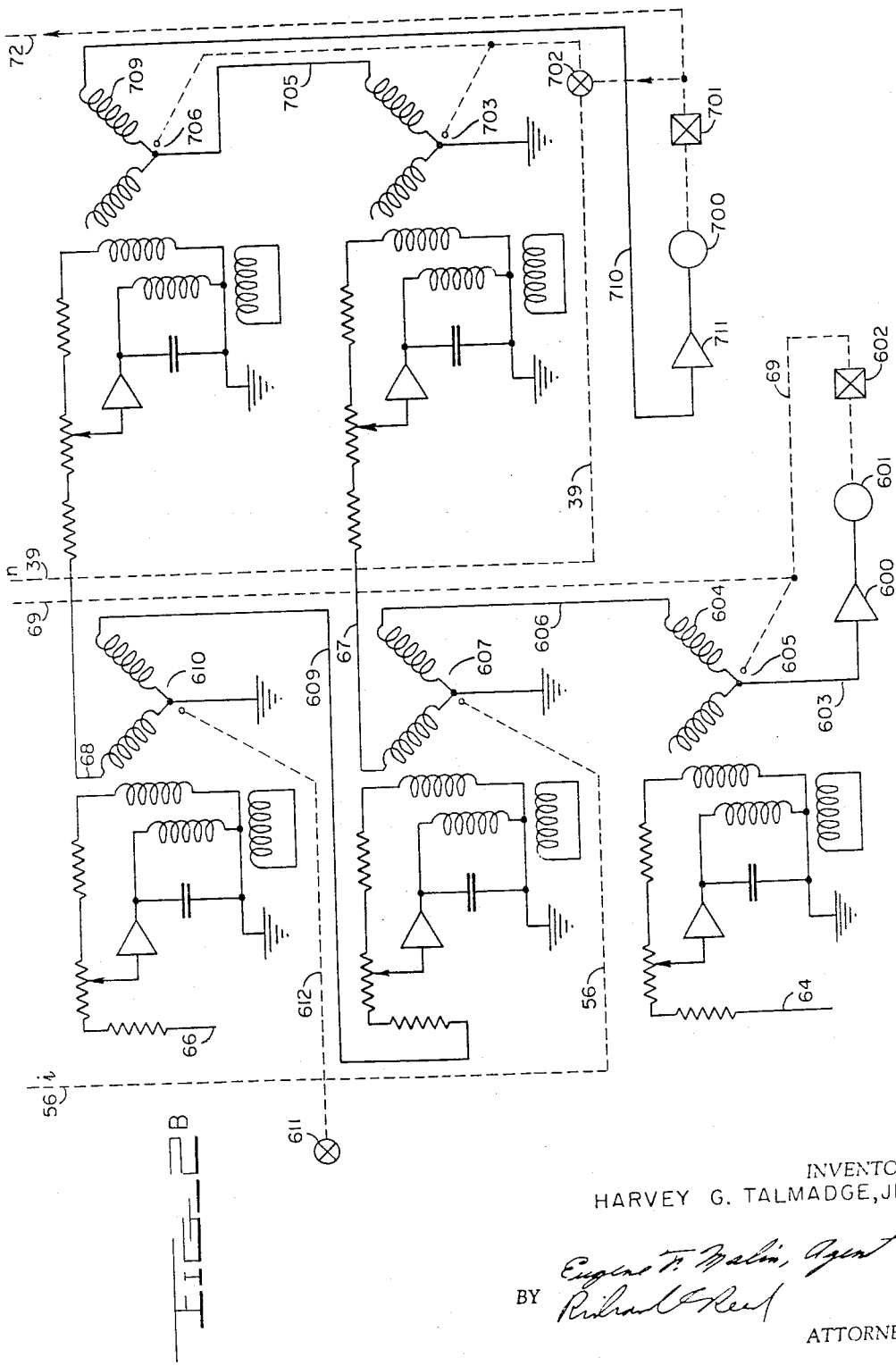

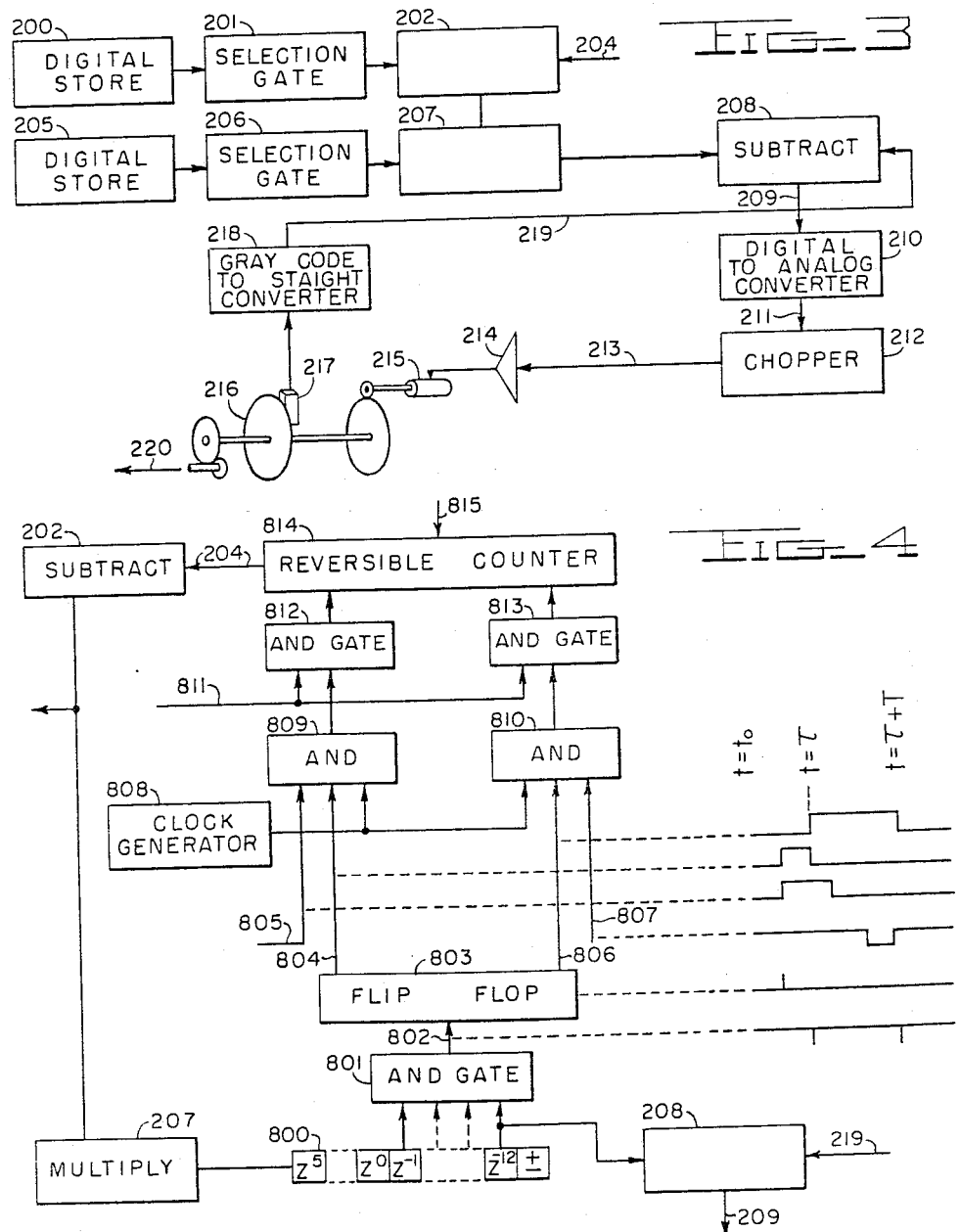

United States Patent Office 3,261,966
Patented July 19, 1966

3,261,966
ORBIT COMPUTER FOR A SATELLITE
POSITION DISPLAY
Harvey G. Talmadge, Jr., Forest Heights, Md., assignor to the United States of America as represented by the Secretary of the Navy
Filed July 30, 1962, Ser. No. 213,553
8 Claims. (Cl. 235—150.271)

The invention described herein may be manufactured and used by or for the Government of the United States of America for govermental purposes without the payment of any royalties thereon or therefor.

This invention relates to a combination of digital and analog techniques, with servo amplifiers to position the shafts of magnetic resolvers which generate sine and cosine functions, to implement equations derived for the calculation of satellite height and a sub-satellite position as latitude and longitude. A description may be found in U.S. Naval Research Laboratory Report 5624. Orbital elements and initial conditions are selected from digital storage, and positions are computed at any arbitrary time. Computer output appears in digital form and, depending upon display design, may be either placed in a register or displayed directly. Essentially continuous orbits can be computed as a succession of satellite positions corresponding to small discrete increments in time through an anomalistic period bracketing the selected epoch. According to the display design, the resulting sub-satellite track will be either displayed directly or stored in a scan converter cathode ray tube, published in U.S. Naval Research Laboratory Research Report 5638.

The object of this invention is to provide a simple and inexpensive computer that will generate signals representative of latitude, longitude and height for selected satellites at selected times.

Another object is to provide a satellite position display by employing a combination of digital and analog techniques.

Other objects, advantages, and novel features of the invention will become apparent from the following detailed description of the invention when considered in conjunction with the accompanying drawings wherein:

FIG. 1 is a block diagram of the orbit computer of the invention;

FIG. 2A is a schematic diagram of the eccentric anomaly, true anomaly and height computers of the invention;

FIG. 2B is a schematic diagram of the latitude and longitude computers of the invention;

FIG. 3 is a block diagram of a representative digital to shaft converter; and

FIG. 4 is a block diagram of a modified mean anomaly computer of the invention.

With reference now to FIG. 1, the computer receives a signal representative of time, $t$, shown at 11, for which a prediction is desired, and acts upon orbital element information from a storage means (not shown) to generate an output in terms of height, H, latitude, $\phi$, and longitude, $\lambda$. Digital inputs 1 to 10 are from the orbital elements storage. The time of perigee 1, $\tau$, the reciprocal of the satellite period 2, $T^{-1}$, the rotation of perigee 3, $\dot{\omega}$, the argument of perigee 4, $\omega$, the earth's rotational speed less precession of nodes 5, $\omega_e - \dot{\Omega}$, longitude of ascending nodes 6, $\Omega$, eccentricity 7, $e$, inclination angle 8, $i$, semimajor axis 9, $a$, and the earth's radius 10, R, are the necessary quantities required in order to secure an accurate prediction. The equations derived for computing the height, latitude and longitude are published in U.S. Naval Research Laboratory Report 5652. To achieve the accuracy required by the latitude and longitudinal output, a digital rather than an analog technique for calculating a number corresponding to the mean anomaly, M, is utilized. Ordinarily, the mean anomaly is computed from the equation $M = 2\pi(t-\tau)T^{-1}$. Mean anomaly is expressed in complete revolutions of shaft 20. The computer calculates M in such units as the ratio, $(t-\tau)/T$. By thus eliminating $2\pi$ from the former equation, an unnecessary digital multiplication is avoided. A further analysis may be found in Appendix C of NRL Report 5624. In this form the mean anomaly represents a number of integral circuits in orbit plus some fraction, measured with reference to the perigee of epoch, designated as $\tau$. The fractional output is used to position the shaft in the eccentric anomaly computer 46 up to one full shaft rotation from the zero position. Real or arbitrary time 11 is fed into a time encoder which is fed into the subtractor 12. The time of perigee 1 is fed from a storage means through a selector gate to the subtractor 12. The output $(t-\tau)$ is fed by means 13 into the multiplier 14. The reciprocal of the satellite period 2 is fed from a storage means through a selector gate to the multiplier 14. The output $(t-\tau)/T$ at 15 is fed to the digital to analog converter 16. This output is a digital number which consists of an integer plus a fraction. The fractional part of this digital number is fed to the digital to analog converter 16 to produce M as a shaft rotation 20 such that as the fraction varies from zero through unity the shaft rotates by an amount which corresponds to satellite motion in orbit from perigee to perigee.

Shaft 20 is connected to the eccentric anomaly computer 46. With the mean anomaly M available as a shaft rotation 20 it is possible to solve Kepler's equation $M = E - e \sin E$ for the eccentric anomaly, E, as a shaft angle by means of a resolver and a servo amplifier, shown in FIG. 2A. Eccentricity, $e$, is received in digital form 7 from digital storage and converted to a shaft position by means of digital to analog converter 40. Eccentricity, $e$, is fed in terms of shaft angles to the eccentric anomaly computer 46 by means 44. The input voltage denoted A sin $wt$ is shown at 45, where $w$ denotes angular frequency of perhaps 400 c.p.s and A is the amplitude in volts. Operational amplifiers and negative feedback shown in FIG. 2A are employed to assure that the voltages induced in the transformer and in all resolvers conform with the input voltages. All resolvers have a tuned input rotor winding which receives power from an operational amplifier. A second rotor winding provides a negative feedback voltage. A third rotor winding, commonly found on precision magnetic resolvers, is so positioned as to nominally have no voltage induced in it, and is shown as short-circuited. Any short circuit currents which flow serve to enhance the desired transformation properties of the resolver. Each resolver has two rotor windings in which the induced signal voltages have amplitudes proportional to the sine and cosine, respectively, of the shaft rotational angle.

The eccentric anomaly computer 46 generates signals for the true anomaly computer 50 and the height computer 57.

The true anomaly is generated in analog form as a shaft rotation at 51. Input signals designated as 49 to the true anomaly computer 50 are generated in the circuitry shown for the eccentric anomaly computer 46. Input voltage denoted as $A \sin wt$ is shown at 48. True anomaly, $v$, is calculated as a shaft angle 51 by means of two resolvers and a servo nulling technique. The circuit is based on equation $$\cos v = \frac{\cos E - e}{1 - e \cos E}$$

This equation is rearranged in the form $$\cos v - e \cos E \cos v - \cos E + e = 0$$

and then implemented as $$A \cos v \sin wt - eA \cos E \cos v \sin wt - A \cos E \sin wt + eA \sin wt = 0$$

The sum represents a null voltage which after amplification causes the servo motor shown in FIG. 2A to so position the $v$ shaft and resolvers as to preserve this null and thus solve for the true anomaly as a shaft angle $v$.

The signal representative of satellite height above the earth's surface is generated in digital form as shown at 76. However, part of the computation is accomplished by analog techniques, using a servo motor to position the shaft of a potentiometer. This potentiometer is excited by a voltage transferred by means 47 from the eccentric anomaly computer 46. The angular displacement of the shaft 58 from its mid-position may be thought of as being proportional to cos E, with one full turn corresponding to the condition $e=1$, $E=90°$. The angular position of shaft 58, after being converted to a digital number by shaft to digital encoder 39 is interpreted as the quantity $1-e \cos E$. Means 60 carries the quantity $1-e \cos E$. This quantity is fed into multiplier 61 along with semi-major axis 9 of the orbital elements storage. The semi-major axis 9 is fed through a selection gate (not shown) to the multiplier 61. Means 62 carries the signal $$a(1 - e \cos E)$$

The earth's radius 10 from digital storage means is fed into subtractor 63 along with the quantity from the multiplier 61. The output of the subtractor 63 to a height register (not shown) will be the height, H, of the satellite above the earth's surface. Therefore a simple digital computer multiplies the quantity $1-e \cos E$ by the semi-major axis, and then diminishes the product by the earth's radius to produce the satellite height above the earth at 76.

The latitude computer 65 accepts as one of its several inputs a shaft angle $\gamma$ defined by the equation $$\gamma = \omega - \dot{\omega}(t - \tau)$$

at 30. The rotation of perigee 3, from the orbital elements storage means, is fed into multiplier 21 along with the output of subtractor 12, $(t - \tau)$, by means 13. The output of the multiplier 21 by means 23 is fed into subtractor 24 along with the argument of perigee 4. The output of subtractor 24 is fed to the digital to analog converter 26 by means 25, to produce the shaft output at 30. The inclination angle 8 is fed from the orbital elements storage means in digital form to the digital to analog converter 52 to produce an output that is in terms of shaft angles at 56, $i$. Shaft 56 is fed into the latitude computer 65. Equation $$\sin \phi = \sin i \sin [v - \omega + \dot{\omega}(t - \tau)]$$

involving latitude, $\phi$, is implemented in the form $$A \sin \phi \sin wt - A \sin i \sin (v - \gamma) \sin wt = 0$$

The latitude computer 65 produces the latitude as shaft rotation 69. The output 30 from the gamma digital to analog converter 26 and the output 51 from the true anomaly computer 50 are subtracted by a differential gear means 611, FIG. 2A, to cause a rotary resolver 610, shown in FIG. 2B, to rotate in $(v - \gamma)$ revolutions and thus to generate 609 the rotor output voltage $$A \sin (v - \gamma) \sin wt$$

This voltage forms the input to a second resolver 607 which has a rotor coupled to the shaft 56 representing the inclination angle. An output voltage is then $$A \sin i \sin (v - \gamma) \sin wt$$

This output 606 of the second resolver is suitably summed with that from a third resolver 605 to secure the null voltage 603. This null voltage, being applied to the servo amplifier 600, causes the servo motor 601 to drive the latitude shaft 69 via gear train 602, as shown in FIG. 2B.

Other outputs of the first and second resolvers from the latitude computer 65, provide the input voltages 67 and 68 to the longitude computer 71. The earth's rotational speed less the precession of nodes 5, is inserted into multiplier 31 with the output from subtractor 12 by means of 13. This output $(t-\tau)(\omega_e - \dot{\Omega})$ is fed by means 32 to subtractor 33 along with the longitude of ascending nodes, 6, from the orbital storage means. This output is represented as $\eta = \Omega - (\omega_e - \dot{\Omega})(t - \tau)$ which is fed by means 34 into a digital to analog converter 35 to produce an angular shaft output 39, $\eta$, which is fed into the longitudinal computer 71. The equation $$\tan [\lambda - \Omega + (\omega_e - \dot{\Omega})(t - \tau)] = \cos i \tan [v - \omega + \dot{\omega}(t - \tau)]$$

is implemented in the form $$A \cos (v - \gamma) \sin (\lambda - \eta) \sin wt - A \cos i \sin (v - \gamma) \cos (\lambda - \eta) \sin wt = 0$$

Three inputs produce the longitude in terms of shaft rotation 72. This shaft rotation is fed into the shaft to digital encoder 73 to produce the output 74. The latitude computer output 69 is fed into shaft to digital encoder 70 to produce output 75. The output 74, 75 and 76 are presented in digital form.

The digital to analog converters 16, 26, 35, 40 and 52 are represented in FIG. 3. The means input to 208 corresponds to means 15, 25, 34, 7 and 8 of FIG. 1. This figure is representative of on-shelf components. Digital storage means shown at 205 and 205 are fed through selection gates 201 and 206 respectively to means 202 and 207. Means 202 and 207 are representative of a digital subtractor and/or a multiplier. Input 204 illustrates a second input to means 202. The subtractor 203 fed by means 207 and the gray code to straight converter 218 by means 219, has an output shown at 209. The output 209 is connected to the digital to analog converter 210. The converter output 211 is fed to chopper 212 and then to the servo amplifier 214 by means 213. The servo motor 215 is connected to the gray code wheel 216 and produces the shaft output 220.

The schematic diagram in FIG. 2A representing an eccentricity anomaly computer, a true anomaly computer and a height computer, and schematic diagram in FIG. 2B representing a latitude computer and a longitude computer will now be further explained. Eccentricity shaft 44 drives an eccentricity potentiometer composed of three sections ganged. One section denoted 314 is energized by 312. Resistor 314 is connected to one winding of resolver 316. The input voltage 45 denotes as $A \sin wt$ may have any convenient amplitude A as determined by the resolver design. Operational amplifiers with negative feedback are employed to insure that the voltages induced in the transformer 310 and in all resolvers conform to the input signal voltages. At servo null, the voltage induced in 317 of the resolver rotor windings shown at 316 is $A \sin E \sin wt$. One section of the 3-gang eccentricity potentiometer is placed across this winding to provide at its wiper arm 309 the voltage $eA \sin E \sin wt$, measured with respect to ground. This wiper arm 309 voltage connected to shaft 44, is compared with the voltage proportional to the angular shaft difference $(M-E)$. The potentiometer at 311 is connected across the coil 307 giving a total voltage of $2A \sin wt$ secured from a center-tap transformer winding 307. With the potentiometer wiper arm 308 at its midpoint, the voltage between the wiper arm and this center-tap is at null. The potentiometer rotation in either direction from the null point of the resistor 311 is proportional to the shaft difference appearing in gear box 305. The gear box 305 is designed to make the voltage between transformer center-tap 306 and the wiper arm 308 equal to $A(E-M)\sin wt$ voltages, where M and E must now be expressed in radian measure.

A differential gear assembly 304 has shaft input 20 from the mean anomaly computer and the shaft input from the eccentric anomaly computer shaft 315 to produce a shaft displacement of $(E-M)$. The amplifier 301 is connected to the center-tap of coil 307 by means 306. The servo motor 302 is connected to the gear means 303 by shaft 315. The output of gear means 303 is thereafter connected to the differential gear assembly 304 for combining the input shaft angles M and E. The output of the differential gear assembly 304 by means of a step-up gear assembly 305 rotates the wiper arm 308.

The voltage $eA \sin wt$ comes from the transformer at 312 and one section of the eccentricity potentiometer denoted 314. The voltage $A \sin wt$ is across the resistor 314. The calibration control 313 adjusts the sinusoidal across the potentiometer shown at 314 to the proper value, so that when this potentiometer is properly set to the eccentricity, $e$, a voltage $eA \sin wt$ is placed into the feedback loop to 318. This voltage is suitably augmented to a voltage $A \cos E \sin wt$ from the resolver 316 at 318. This resolver voltage is also attenuated to $eA \cos E \sin wt$ by means of the third eccentricity potentiometer located in the eccentric anomaly computer connected to shaft 44 and connected to the true anomaly computer by means 405. The operational amplifier 319 and the negative feedback are employed to assure that the voltages induced in the resolver conform with voltage $A \sin wt$ at input 322. Resistor 321 provides a calibration preset for voltage amplitude. The resolver 400 is excited according to the voltage $eA \cos E \sin wt$ from means 405 and generates in one rotor winding of 400 the voltage $eA \cos v \cos E \sin wt$, since the rotor is set to the shaft angle $v$, at 51. This voltage is suitably added to the feedback loop $eA \sin wt$ from 314, the voltage $A \cos v \sin wt$ from the resolver 406 which is also set to the shaft angle, $v$, at 51 and the voltage $A \cos E \sin wt$ from 318. Thus the circuit sum of the four voltages is $A \cos v \sin wt - eA \cos E v \sin wt - A \cos E \sin wt + eA \sin wt = 0$. The sum represents a null voltage which after amplification by servo amplifier 402, by means 401, causes the servo motor 403 to so position the shaft 51 and resolvers 400 and 406 as to preserve this null and thus solve the equation for the true anomaly as the shaft angle $v$. The equation solved is $\cos v = (\cos E - e) \div (1 - e \cos E)$. The height computer in FIG. 2A uses the servo motor 501 and amplifier means 500 to position the shaft 58 through gear means 502 and 503 in such a manner to position the potentiometer shown at 505. This potentiometer shown at 505 is excited by a voltage $2A \sin wt$ from another center-tapped secondary winding of the transformer 310 shown at 506. Preset resistors 507 and 508 permit calibration. The servo action keeps the voltages between the transformer center-tap shown at 506 and the potentiometer wiper arm shown at 505 equal to, but bucking, the voltage $eA \cos E \sin wt$ from the resolver 316 and eccentricity potentiometer connected to the resolver 316 through means 405, both of which are part of the eccentric anomaly computer. The angular displacement of the shaft at 505 from its midposition may be proportional to $e \cos E$, with one full turn corresponding to the condition $e=1$, $E=90°$. E may have either polarity. The angular position of this shaft, after being encoded by the shaft to digital encoder 59, is interpreted as the quantity $(1-e \cos E)$. A simple digital computer then produces the satellite height above the earth.

To obtain the latitude from the latitude computer, FIG. 2B, the equation $\sin \phi = \sin i \sin[v-\omega+\dot{\omega}(t-\tau)]$ involving latitude is implemented in the form $A \sin \phi \sin wt - A \sin i \sin(v-\gamma) \sin wt = 0$ to produce $\phi$ as a shaft rotation. The first term of the latter equation is readily secured by exciting the resolver 605 with a sinusoidal voltage $A \sin wt$ on the input, 64, and coupling the resolver shaft to the shaft 69 to produce at one rotor winding 604 the voltage $A \sin \phi \sin wt$. The resolver 605 is connected to the servo amplifier 600 by means 603. The amplifier 600 is connected to the servo motor 601 which in turn is connected to the shaft 69 through gear box 602. Input $A \sin wt$ shown at 66 to resolver 610 produces two outputs. The shaft rotations 51 and 30 are subtracted by the differential gear 611 to cause the rotor of the resolver 610 to rotate by means of shaft 612. Thus, $(v-\gamma)$ revolutions are generated and the first rotor output voltage $A \sin(v-\gamma) \sin wt$ shown at 609 is obtained from resolver 610. A second output 68 becomes an input to the longitude computer 71. The voltage of output 68 is set forth in detail below. The first output voltage is transferred to the input of the resolver 607 by means 609. The resolver 607 has its rotor coupled to the shaft 56, the inclination angle, $i$. The resolver 607 has two outputs the first output voltage shown at 606 is then $A \sin i \sin(v-\gamma) \sin wt$. This output voltage is suitably summed with that of resolver 605 to secure the null voltage indicated by the left hand side of equation $A \sin \phi \sin wt - A \sin i \sin(v-\gamma) \sin wt = 0$. The null voltage, being applied to the servo amplifier, causes the servo amplifier 600 to actuate the servo motor 601 to drive the latitude shaft 69 by means of gearbox 602 and the shaft of resolver 605 so as to preserve this null and thus the equation for latitude is solved in terms of shaft rotation.

To obtain the longitude, $\lambda$, from the longitude computer, FIG. 2B, the equation $\tan[\lambda - \Omega + (\omega_e - \dot{\Omega})(t-\tau)] = \cos i \tan[v-\omega+\dot{\omega}(t-\tau)]$ is restated in the form $\tan(\lambda - \eta) = \cos i \tan(v-\gamma)$ and, finally, $\cos(v-\gamma) \sin(\lambda - \eta) = \cos i \sin(v-\gamma) \cos(\lambda - \eta)$. This equation is implemented in the form $A \cos(v-\gamma) \sin(\lambda - \eta) \sin wt - A \cos i \sin(v-\gamma) \cos(\lambda - \eta) \sin wt = 0$ forming the null signal to the servo amplifier. The eta shaft displacement 39 is first subtracted from the longitudinal shaft displacement 72 by means of a differential gear assembly 702 to cause shafts for both resolvers 703 and 706 to be rotated according to the angle $(\lambda - \eta)$. The second outputs 67 and 68 from resolvers 607 and 610, respectively, in the latitude computer provide input signals to resolvers 703 and 706. The input of line 67 to the resolver 703 whose shaft is rotated by the output from the differential gear assembly 702 produces an output 705 with a voltage $A \cos i \sin(v-\gamma) \cos(\lambda - \eta) \sin wt$ which is applied to the rotor of resolver 706. The resolver 706 generates in one rotor winding the voltage $A \cos(v-\gamma) \sin(\lambda - \eta) \sin wt$. The servo amplifier 711 by means 710 then causes the servo motor 700 to drive the longitude shaft 72 through gear means 701 in such a way as to preserve the null and to solve the equation for the longitude, $\lambda$, as a shaft rotation.

A modified mean anomaly computer shown in FIG. 4 generates an orbit by varying the time input to the computer from $t=t_0$ in the negative direction to the time of nearest perigee and then advances the time in the positive direction to the time of that following perigee. A selected time, $t_0$, goes not directly to the subtractor 202, but rather to the "set" input of the reversible counter 814 by means 815. The state of this counter is then read into the subtractor unit by means 204. Once $t_0$ is set into the counter 814, and the flip-flop 803 has been set, a counter enable gate 805 permits clock pulses from 808 to enter the reverse counter input of the counter 814 through the AND gates 809 and 812. This is equivalent to varying the time in the negative direction.

Computation of the $(t-\tau)$ $T^{-1}$ product follows the changes in state of the counter, so that when the product becomes an exact integer, the null pulse from the output of the product register 800 will allow the AND gate 801 to cause the flip-flop 803 by means 802 to change state. This transition indicates that the time indicated by the state of the reversible counter has progressed from $t=t_0$ to the immediately preceding perigee $t=\tau$, and the computer is now set to the initial condition to generate the desired orbit. Even though the flip-flop 803 is now acting to gate the clock pulses by means 804 and 806 into the forward counting input of the counter, counting will not proceed until removal of the servo inhibit pulse 807, thus indicating that the servo has nulled to the condition $M=0$ and $t=\tau$. The end of the orbit is marked by a second null pulse from the AND gate 801 of the product register 800. The AND gates 812 and 813 cut down excessive computation time of the orbit scanning. The AND gates 812 and 813 consist of a multiplicity of AND gates, there being several for each of the counter stages to which the clock pulses are to be applied. The approximate solution to provide a reasonable uniform spacing of the position points is to be secured by means of many AND gates. OR gates couple the outputs of several AND gates to each of the several counter stages. The reverse counter enable gate 805, the inhibit gate 807 from the servos, the reverse counter gate 804 from the flip-flop 803 and the forward counter gate 806 from the flip-flop 803 are shown in FIG. 4 in pulse form.

The output of the reversible counter 814 is connected to the subtractor 202, which is equivalent of 12 in FIG. 1. The subtractor 202 is connected to the multiplier 207, which is equivalent of 14 in FIG. 1. The output of the multiplier 207 is connected to the register 800. A fractional part of the register output is fed to the digital to analog converter.

Obviously, many other modifications and variations of the present invention are possible in the light of the above teachings. It is therefore to be understood that within the scope of the appended claims, the invention may be practiced otherwise than as specifically described.

What is claimed is:

1. A tracking satellite computer comprising; a digital storage means for storage of orbital elements and initial conditions of a satellite, digital computing means for obtaining products and remainders of stored orbital elements and initial conditions accurately, said digital storage means connected to said digital computing means, said digital computing means including a first means to convert the digital output into shaft rotation, second means to convert digital storage information into shaft rotation, said digital storage means connected to said second means, analog computing means for producing indications of height, latitude and longitude in shaft rotation, said first and second means connected to said analog means, and a third means for converting the shaft rotation indicative of height into digital form, said analog means connected to said third means, said third means connected to said digital computing means for producing a signal representative of height.

2. A device according to claim 1 wherein said analog means includes resolver means for generating sine, cosine and product functions.

3. A device according to claim 2 wherein said analog means includes servo amplifier means connected to said resolver means to drive a servo motor, said motor driving an output shaft, said shaft is connected to said resolver means to preserve a null voltage.

4. A device according to claim 2 wherein said digital means includes a means for generating a signal representation of an orbit.

5. A device according to claim 2 including a fourth means for converting said latitude and longitude shaft rotation into digital form, said analog means connected to said fourth means.

6. A tracking satellite computer comprising; a digital storage means, said storage means connected to a first digital computer means, said first digital computer means producing an output in shaft rotation, said storage means connected to a first digital to analog converter means for producing an output in shaft rotation, an eccentric anomaly computer means, said first digital computer means and said first converter connected to said eccentric anomaly computer means, said eccentric anomaly computer means includes magnetic resolver means for generating sine, cosine and product functions, said eccentric anomaly computer connected to a height computer, said height computer coupled to a second digital computer means for producing a signal representative of satellite height in digital form, said eccentric anomaly computer means connected to a true anomaly computer means, said true anomaly computer means includes magnetic resolver means, said digital storage means connected to a third digital computer means for producing an output in shaft rotation, said third digital computer means connected to a second digital to analog converter means for producing an output in shaft rotation, said second converter and said true anomaly computer means connected to a latitude computer means, said latitude computer means connected to means for producing a signal representative of latitude in digital form, said latitude computer including magnetic resolvers for producing an input to a longitude computer means, said storage means connected to a fourth digital computer means for producing an output in shaft rotation, said fourth digital computing means connected to said longitude computer means, and said longitude computer including magnetic resolver means connected to a means for producing a signal representative of longitude in digital form.

7. A device according to claim 6 wherein said first and fourth digital computer means produce outputs in shaft rotation by means of digital to analog converters, wherein said height computer is coupled to said second digital computer means by means of a shaft to digital encoder, and wherein said means for producing the signals representative of latitude and longitude in digital form are shaft to digital encoders.

8. A device according to claim 7 wherein said eccentric anomaly computer means includes a servo amplifier driving a servo motor, said motor drives a shaft which drives the eccentric anomaly resolver, a potentiometer placed across a winding of the resolver, said potentiometer having a first wiper arm driven by said output shaft of said first converter for producing an input to said servo amplifier, a second wiper arm of said potentiometer placed across a second winding of said eccentric anomaly computer resolver for producing the input to said true anomaly computer means, said true anomaly computer output and said third digital computer means output are connected to a differential gear in said latitude computer to cause rotation of a first resolver, said second converter producing an input in shaft rotation to said latitude computer to cause the rotor of a second resolver to rotate the output of the said first resolver is connected to said second resolver, the output of said second resolver is connected to a third resolver, said third resolver produces an output representation of latitude as a shaft rotation, said first and second latitude resolvers produce inputs to a first and a second longitude computer resolver.

No references cited.

MALCOLM A. MORRISON, *Primary Examiner.*

K. W. DOBYNS, *Assistant Examiner.*